& OLDS

(12) United States Patent
Hammoud et al.

(10) Patent No.: US 9,969,293 B2
(45) Date of Patent: May 15, 2018

(54) BATTERY THERMAL CONDITIONING TO EXTEND BATTERY USEFUL LIFE IN ELECTRIFIED VEHICLES

(71) Applicant: FORD GLOBAL TECHNOLOGIES, LLC, Dearborn, MI (US)

(72) Inventors: Mazen Hammoud, Dearborn, MI (US); Thomas Scott Gee, Canton, MI (US); Kevin Layden, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 14/672,517

(22) Filed: Mar. 30, 2015

(65) Prior Publication Data

US 2016/0288659 A1    Oct. 6, 2016

(51) Int. Cl.
| | |
|---|---|
| *H02J 7/00* | (2006.01) |
| *B60L 11/18* | (2006.01) |
| *H01M 10/625* | (2014.01) |
| *H01M 10/633* | (2014.01) |
| *H01M 10/44* | (2006.01) |

(52) U.S. Cl.
CPC ......... *B60L 11/187* (2013.01); *B60L 11/1862* (2013.01); *H01M 10/625* (2015.04); *H01M 10/633* (2015.04); *H01M 10/443* (2013.01); *H01M 2220/20* (2013.01)

(58) Field of Classification Search
CPC ............................... Y02T 90/14; H02J 7/0054
USPC ............................... 180/65.21; 320/109, 103
See application file for complete search history.

(56) References Cited

U.S. PATENT DOCUMENTS

| | | | |
|---|---|---|---|
| 2013/0221916 A1 | 8/2013 | Kelty et al. | |
| 2013/0221928 A1* | 8/2013 | Kelty | B60L 11/187 320/134 |
| 2014/0093760 A1* | 4/2014 | Hermann | H02J 7/0075 429/66 |
| 2014/0207318 A1 | 7/2014 | Sisk et al. | |
| 2014/0266038 A1 | 9/2014 | Gibeau et al. | |
| 2014/0277869 A1 | 9/2014 | King et al. | |

\* cited by examiner

*Primary Examiner* — Drew A Dunn
*Assistant Examiner* — Zixuan Zhou
(74) *Attorney, Agent, or Firm* — Carlson, Gaskey & Olds

(57) ABSTRACT

A method according to an exemplary aspect of the present disclosure includes, among other things, conditioning a battery assembly of an electrified vehicle to a desired thermal level in a manner that extends useful life of the battery assembly, the conditioning step including heating or cooling the battery assembly with a thermal management system operable during both vehicle ON conditions and vehicle OFF conditions.

21 Claims, 4 Drawing Sheets

BATTERY THERMAL CONDITIONING TO EXTEND BATTERY USEFUL LIFE IN ELECTRIFIED VEHICLES

TECHNICAL FIELD

This disclosure relates to a vehicle system and method for an electrified vehicle. The vehicle system is configured to thermally condition a battery assembly of the electrified vehicle in a manner that extends its useful life.

BACKGROUND

The need to reduce fuel consumption and emissions in vehicles is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on an internal combustion engine to drive the vehicle.

Electrified vehicle powertrains are typically equipped with a high voltage battery assembly having a plurality of battery cells that store electrical power for powering the electric machines. The battery cells must be charged prior to vehicle use. When parked, some electrified vehicles, such as plug-in hybrid electric vehicles or battery electric vehicles, may connect to an external power source to recharge the battery cells. The amount of power that the battery assembly can accept from the external power source can be limited by several factors including the battery state of charge (SOC) and temperature.

SUMMARY

A method according to an exemplary aspect of the present disclosure includes, among other things, conditioning a battery assembly of an electrified vehicle to a desired thermal and SOC levels in a manner that extends useful life of the battery assembly, the conditioning step including heating or cooling and discharging or charging the battery assembly with a thermal management system operable during both vehicle ON conditions and vehicle OFF conditions.

In a further non-limiting embodiment of the foregoing method, the conditioning step includes powering the thermal management system using power from the battery assembly if a SOC of the battery assembly exceeds an upper SOC threshold.

In a further non-limiting embodiment of either of the foregoing methods, the conditioning step includes powering the thermal management system using grid power from an external power source if the SOC of the battery assembly is below the upper SOC threshold and the electrified vehicle is On-Plug.

In a further non-limiting embodiment of any of the foregoing methods, the method includes determining if the electrified vehicle is On-Plug if the SOC of the battery assembly fails to exceed the upper SOC threshold.

In a further non-limiting embodiment of any of the foregoing methods, the method includes determining whether the SOC of the battery assembly is below a lower SOC threshold if the electrified vehicle is On-Plug.

In a further non-limiting embodiment of any of the foregoing methods, the method includes charging the battery assembly to a desired SOC level if the SOC of the battery assembly is below the lower SOC threshold.

In a further non-limiting embodiment of any of the foregoing methods, the method includes controlling the battery assembly in an Extended Life Mode.

In a further non-limiting embodiment of any of the foregoing methods, the method includes controlling the battery assembly in a Normal Mode if the Extended Life Mode has not been requested.

In a further non-limiting embodiment of any of the foregoing methods, the method includes controlling the battery assembly in an Energy Miser Mode if neither the Extended Life Mode nor the Normal mode have been requested.

A method according to another exemplary aspect of the present disclosure includes, among other things, thermally managing a battery assembly of an electrified vehicle with a thermal management system using power from the battery assembly if a SOC of the battery assembly exceeds an upper SOC threshold and thermally managing the battery assembly using grid power from an external power source if the SOC of the battery assembly is below the upper SOC threshold and the electrified vehicle is On-Plug.

In a further non-limiting embodiment of the foregoing method, the method includes, prior to the thermally managing steps, determining whether an Extended Life Mode has been requested.

In a further non-limiting embodiment of either of the foregoing methods, the method includes determining if the electrified vehicle is On-Plug if the SOC of the battery assembly fails to exceed the upper SOC threshold and if the electrified vehicle is On-Plug, then determining whether the SOC of the battery assembly is below a lower SOC threshold.

In a further non-limiting embodiment of any of the foregoing methods, the method includes charging the battery assembly to a desired SOC level if the SOC of the battery assembly is below the lower SOC threshold.

In a further non-limiting embodiment of any of the foregoing methods, the method includes determining whether a Normal Mode for controlling the battery assembly has been requested, determining whether the electrified vehicle is On-Plug, determining whether a temperature of the battery assembly is within a predefined temperature range for charging and thermally managing the battery assembly with the thermal management system using the grid power if the temperature of the battery assembly is outside of the predefined temperature range for charging.

In a further non-limiting embodiment of any of the foregoing methods, the method includes charging the battery assembly to a 100% SOC after the temperature of the battery assembly is within the predefined temperature range for charging.

In a further non-limiting embodiment of any of the foregoing methods, the method includes thermally managing the battery assembly with the thermal management system using the grid power to maintain the temperature of the battery assembly within the predefined temperature range for extending useful life of the battery assembly.

In a further non-limiting embodiment of any of the foregoing methods, the method includes determining whether an Energy Miser Mode for controlling the battery assembly has been requested, determining whether the electrified vehicle is On-Plug, determining whether a temperature of the battery assembly is within a predefined temperature range for charging; and thermally managing the battery assembly with the thermal management system using the grid power if the temperature of the battery assembly is outside of the predefined temperature range for charging.

In a further non-limiting embodiment of any of the foregoing methods, the method includes charging the battery assembly to a 100% SOC after the temperature of the battery assembly is within the predefined temperature range for charging.

In a further non-limiting embodiment of any of the foregoing methods, the thermally managing steps are performed in a manner that extends useful life of the battery assembly.

A vehicle system according to another exemplary aspect of the present disclosure includes, among other things, a battery assembly, a thermal management system configured to modify a temperature of the battery assembly, a charger module configured to charge the battery assembly and a control module configured to command conditioning of the battery assembly using the thermal management system and configured to command charging of the battery assembly using the charger module in a manner that extends useful of the battery assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system and method for conditioning a battery assembly of an electrified vehicle to extend its useful life. The battery assembly may be either heated or cooled using a battery thermal management system configured to thermally manage the battery assembly during either vehicle ON conditions (i.e., battery undergoes charging and discharging operations, etc.) or vehicle OFF conditions (i.e. vehicle is not running, is in storage, etc.). The thermal management system may be powered using grid power from an external power source or battery power from the battery assembly. In some embodiments, the battery assembly is maintained within a desired state of charge (SOC) range to further extend its useful life. The vehicle system may be configured to allow a user to select different battery control modes that each emphasizes some criteria (e.g., battery life, vehicle range, energy conservation, etc.) over other criteria. These and other features are discussed in greater detail in the following paragraphs of this detailed description.

Figure 1:
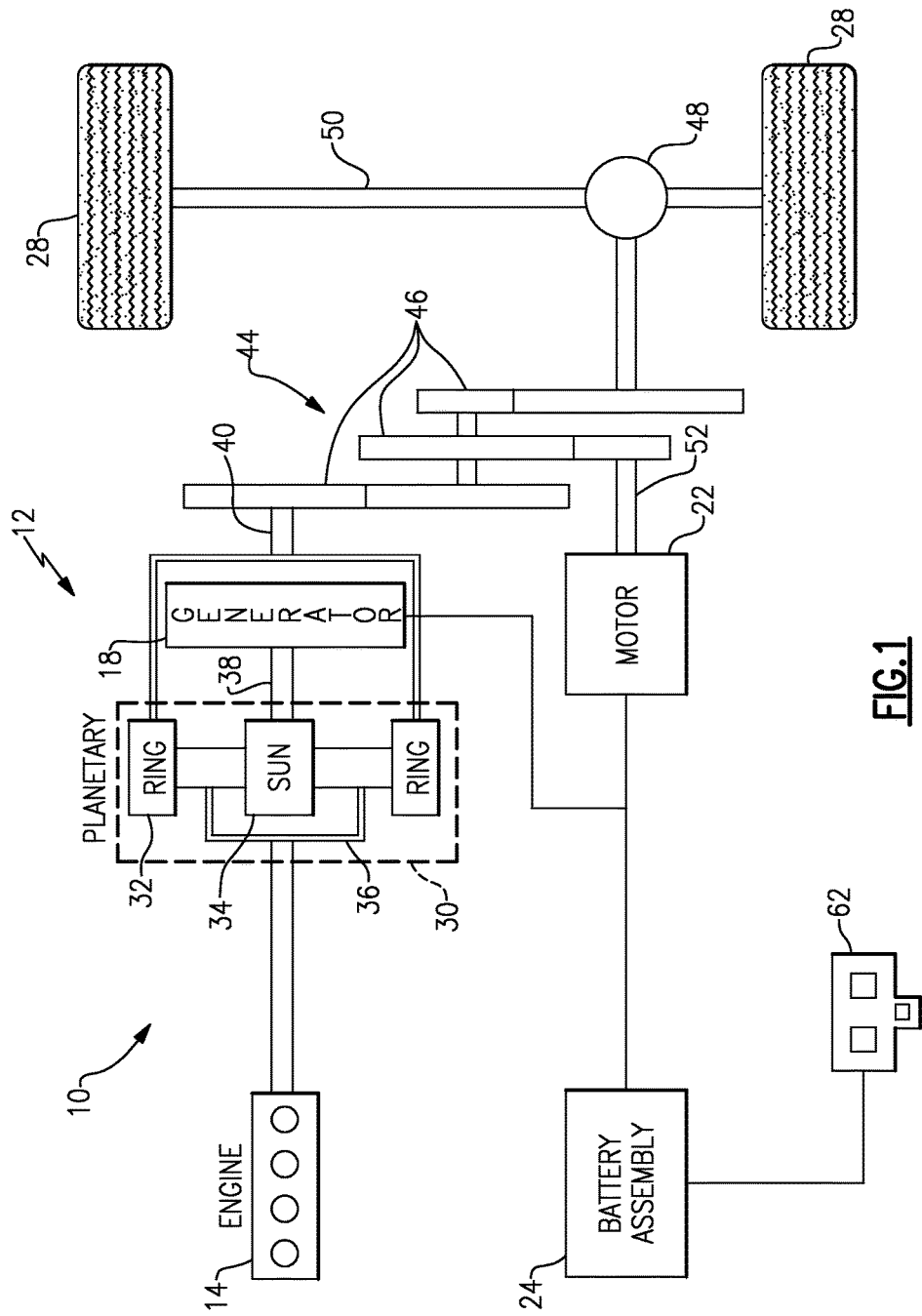
FIG. 1 schematically illustrates a powertrain of an electrified vehicle.

FIG. 1 schematically illustrates a powertrain 10 of an electrified vehicle 12. The electrified vehicle 12 of FIG. 1 is depicted as a plug-in hybrid electric vehicle (PHEV) in this embodiment; however, it should be understood that the concepts of this disclosure are not limited to PHEV's and could extend to other electrified vehicles, including, but not limited to, battery electric vehicles (BEV's).

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 cooperates as part of a regenerative braking system in which it can be employed to output torque. For example, the motor 22 can output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charging module 62 that is connected to a charging station powered by an external power source, such as an electrical grid, a solar panel, or the like.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
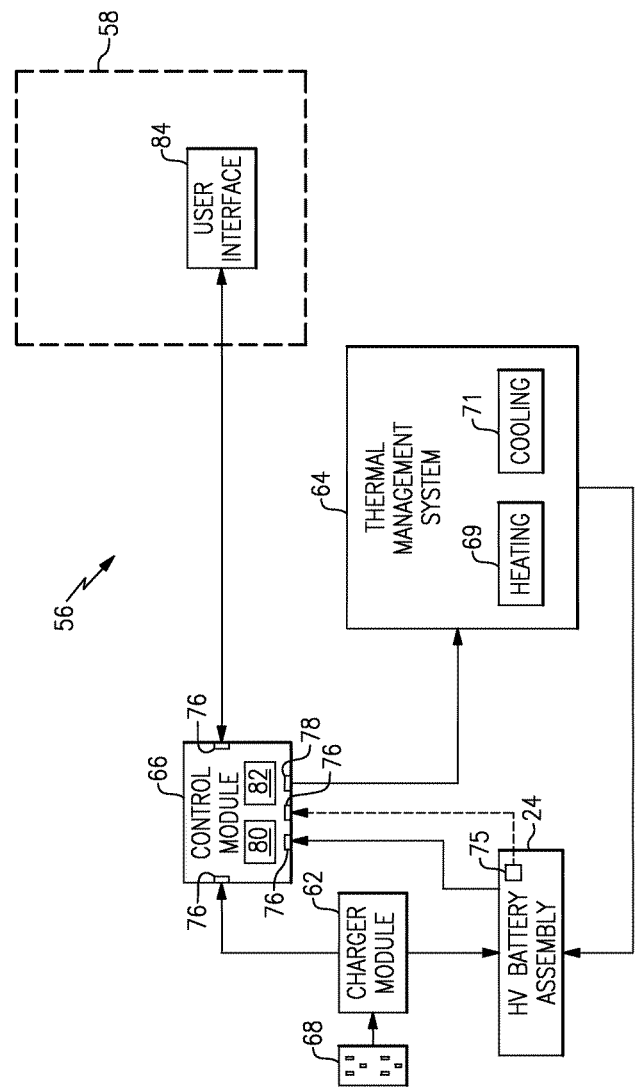
FIG. 2 illustrates a vehicle system of an electrified vehicle.

FIG. 2 is a highly schematic depiction of a vehicle system 56 that may be incorporated into a vehicle, such as the electrified vehicle 12 of FIG. 1. The vehicle system 56 is adapted to control a high voltage battery assembly 24 of the electrified vehicle 12 to maintain a desired thermal level and a desired SOC level in a manner that extends the useful life of the battery assembly 24. In other words, the vehicle system 56 is designed to extend battery serviceable life by controlling various operating parameters of the battery assembly 24.

In one non-limiting embodiment, the exemplary vehicle system 56 includes the battery assembly 24, a charger module 62, a thermal management system 64 and a control module 66. The battery assembly 24 may include one or more battery cells, capacitors, or other energy storage devices. The energy storage devices of the battery assembly 24 store electrical energy that may be supplied to power various loads residing onboard an electrified vehicle. These loads may include various high voltage loads (e.g., electric machines, etc.) or various low voltage electrical loads (e.g., lighting systems, low voltage batteries, logic circuitry, etc.).

The charger module 62 is operably connected between the battery assembly 24 and an external power source 68. The charger module 62 is adapted to selectively supply the energy required to charge the energy storage devices of the battery assembly 24. In one embodiment, the charger module 62 plugs into the external power source 68 to receive electrical power and deliver the power to the battery assembly 24. The external power source 68 may include off-board power, such as utility/grid power.

In one embodiment, the charger module 62 is configured to charge the battery assembly 24. If necessary, the charger module 62 may convert alternating current (AC) received from the external power source 68 to direct current (DC) for charging the battery assembly 24. In an alternative embodiment, a device separate from the vehicle system 56 is configured to perform the AC to DC conversion. The charger module 62 is also configured to establish maximum available charging currents for charging the battery assembly 24, among other operational parameters.

The thermal management system 64 is equipped to thermally condition the battery assembly 24 to either remove heat from the energy storage devices or add heat to such devices. Although not shown, the thermal management system 64 could be operably coupled to other components of the vehicle, such as the vehicle heating, ventilation and air conditioning (HVAC) system.

In one embodiment, the thermal management system 64 includes a heating device 69 and a cooling device 71. The heating device 69 and the cooling device 71 may be part of either a liquid cooled system or an air cooled system. In one non-limiting embodiment, the heating device 69 includes an electric heater and the cooling device 71 includes an evaporator. The thermal management system 64 may include additional or alternative components for thermally managing the heat generated by the energy storage devices housed within the battery assembly 24.

In one embodiment, the thermal management system 64 is powered by grid power when the vehicle is "On-Plug" (i.e., plugged into the external power source 68). In another embodiment, the thermal management system 64 is powered by the battery assembly 24 when the vehicle is "Off-Plug" (i.e., unplugged from the external power source 68).

The vehicle system 56 may additionally include a user interface 84 for communicating information to and from vehicle passengers. The user interface 84 may provide a visual output to the passengers. In one embodiment, the user interface 84 is located inside a vehicle passenger cabin 58 for providing the vehicle passengers with the ability to select various settings, including battery control modes. Alternatively, the user interface 84 may be located off-board, such as a web site or mobile application, and communicate remotely through wireless communication to the vehicle's control system.

Figure 3:
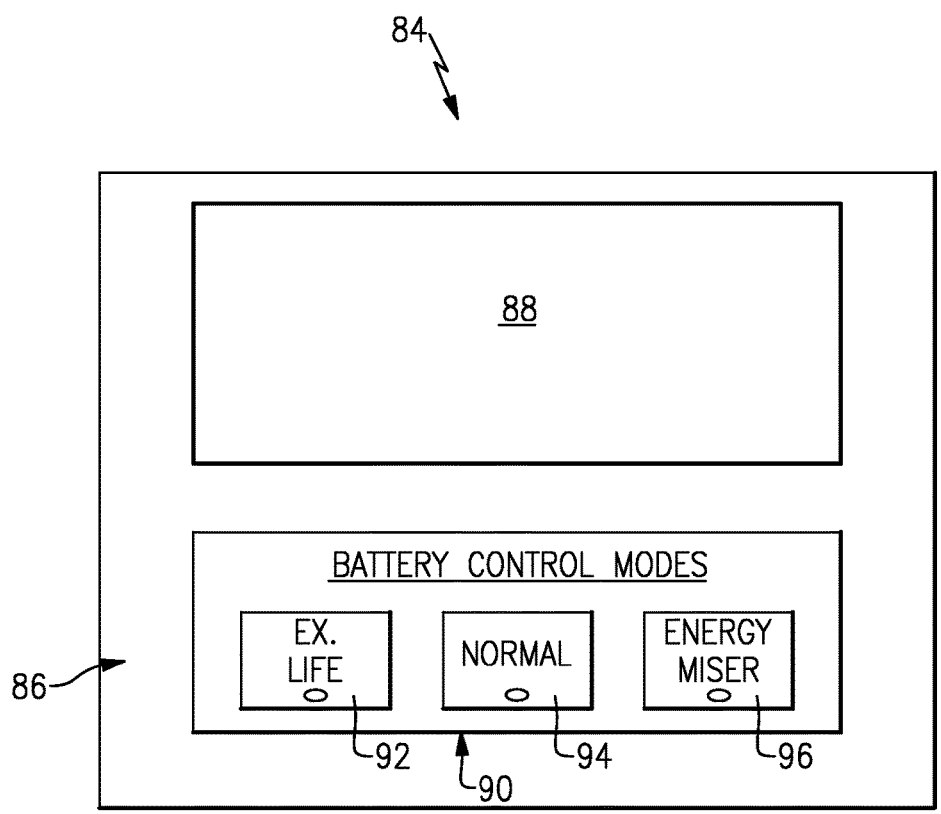
FIG. 3 illustrates an exemplary user interface of the vehicle system of FIG. 2.

FIG. 3 illustrates one non-limiting embodiment of the user interface 84. The user interface 84 may include a user input 86 and a display 88. The user input 86 may include various actuators, selectors, knobs, switches, touch screens or the like for inputting driver preferences for allowing the passengers to select a desired battery control mode associated with the battery assembly 24. In one embodiment, the user input 86 includes a mode selector 90 for selecting a desired battery control mode for controlling the battery assembly 24. For example, the mode selector 90 may include an Extended Life Mode button 92 for selecting an Extended Life Mode, a Normal Mode button 94 for selecting a Normal Mode, and an Energy Miser Mode button 96 for selecting an Energy Miser Mode. Of course, these are intended as non-limiting embodiments of possible battery control modes.

As further discussed below, the Extended Life Mode is designed to emphasize useful life of the battery assembly 24 over other criteria such as vehicle range, fuel economy, energy conservation, etc. Normal Mode is designed to achieve a balance between vehicle range and useful life. Finally, Energy Miser Mode is designed to emphasize energy conservation over other criteria.

Actuation of one of the buttons 92, 94 and 96 communicates a signal to the control module 66 indicating that the vehicle passenger wishes to control the battery assembly 24 in a particular way. Upon receipt of such a signal, the control module 66 is able to command a plurality of operational values for controlling the battery assembly 24 to achieve a desired mode of operation. These operational values are design dependent and could vary depending on the type of vehicle and the configuration of the vehicle system 56, among other factors.

Referring again to FIG. 2, the control module 66 may be part of an overall vehicle control unit, such as a vehicle system controller (VSC) or could alternatively be a stand-alone control unit separate from the VSC. In one embodiment, the control module 66 includes executable instructions for interfacing with and commanding operation of the various components of the vehicle system 56, including but not limited to, the charger module 62, the thermal management system 64, the battery assembly 24 and the user interface 84. The control module 66 may include multiple inputs 76 and outputs 78 for interfacing with the various components of the vehicle system 56. The control module 66 may include a processing unit 80 and non-transitory memory 82 for executing the various control strategies and modes of the vehicle system 56.

In one non-limiting embodiment, the control module 66 is configured to receive temperature information concerning the battery assembly 24. The temperature information may be monitored using a sensor system 75 that monitors the temperature of the energy storage devices of the battery assembly 24. In another embodiment, the control module 66 is configured to monitor and control the SOC of the battery assembly 24, which is typically indicated as a percentage. In yet another embodiment, the control module 66 is configured to determine the thermal needs of the battery assembly 24, or in other words, determine when the battery assembly 24 needs to be heated and when it needs to be cooled. In still another embodiment, the control module is configured to determine when to start and stop charging of the battery assembly 24 as well as the charging rate to be used. These are but non-limiting examples of the many functions of the control module 66 of the vehicle system 56.

Figure 4:
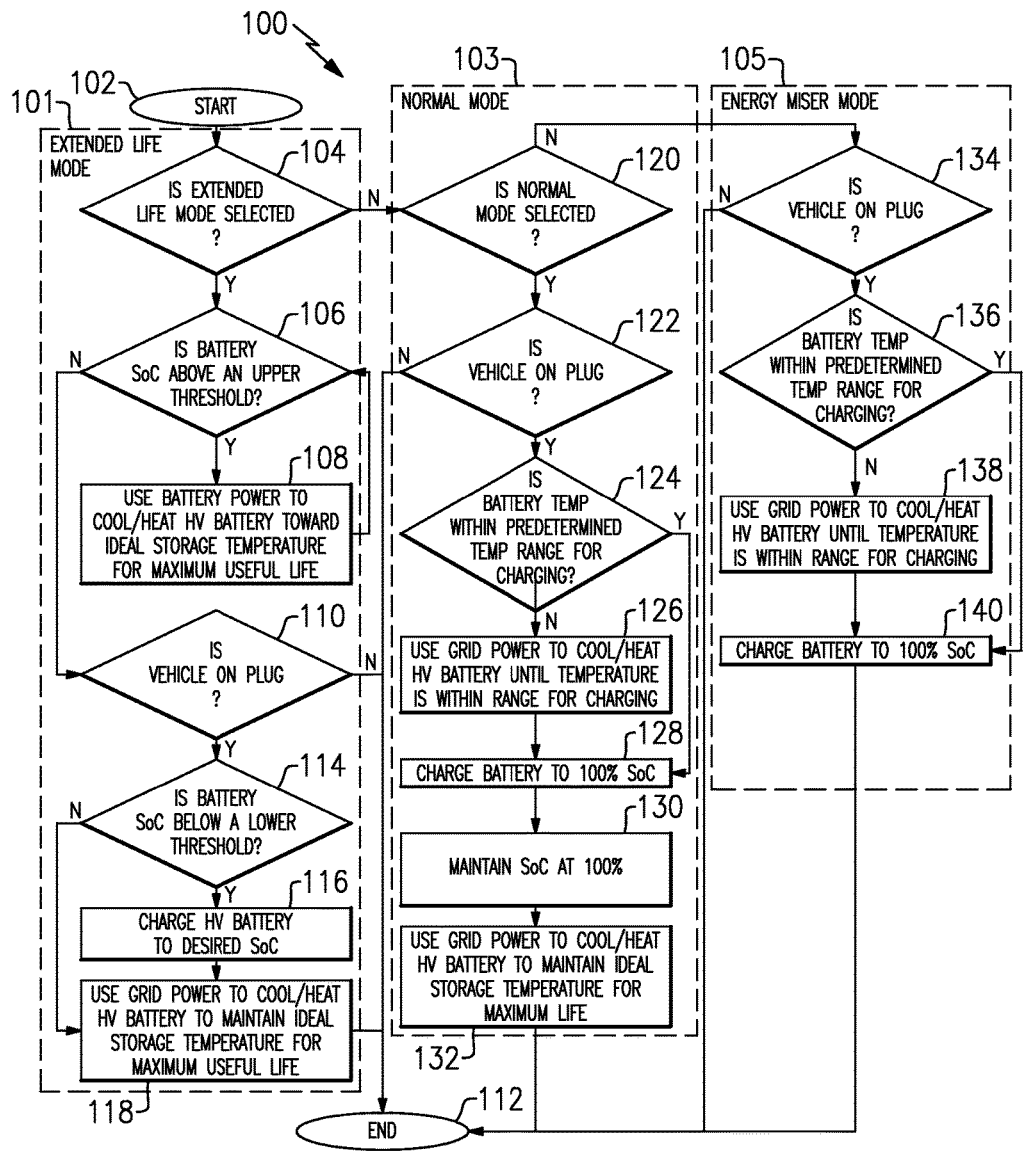
FIG. 4 schematically illustrates a control strategy for controlling a battery assembly of an electrified vehicle in a manner that extends the useful life of the battery assembly.

FIG. 4, with continued reference to FIGS. 1-3, schematically illustrates a control strategy 100 for controlling the vehicle system 56. For example, the control strategy 100 can be performed to condition the battery assembly 24 of the electrified vehicle 12 during either vehicle ON conditions or vehicle OFF conditions in a manner that extends the useful life of the battery assembly 24. The control module 66 can be programmed with one or more algorithms adapted to execute the control strategy 100, or any other control strategy. In one non-limiting embodiment, the control strategy 100 may be stored as executable instructions in the non-transitory memory 82 of the control module 66.

In one embodiment, the control strategy 100 includes an Extended Life Mode 101, a Normal Mode 103 and an Energy Miser Mode 105. Each of these modes, including their various control sequences and associated operational parameters, is detailed below. Although not specifically detailed here, other modes could also be programmed as part of the control strategy 100.

As shown in FIG. 4, the control strategy 100 begins at block 102. At block 104, the control strategy 100 determines whether Extended Life Mode 101 has been selected. This step may be confirmed, for example, if a vehicle passenger has selected the Extended Life Mode button 92 using the user interface 84. If yes, a signal is communicated to the control module 66 indicating that the passenger desires operation in Extended Life Mode 101, and thus, wishes to emphasize useful life of the battery assembly 24 over other vehicle criteria.

If Extended Life Mode 101 has been selected at block 104, the control strategy 100 may then determine, at block 106, whether the SOC of the battery assembly 24 exceeds an upper SOC threshold. In one non-limiting embodiment, the upper SOC threshold is set at 75% SOC. However, the upper SOC threshold is a customizable value that could be set at any desired percentage and will be a function of the battery assembly's 24 make-up or chemistry. The control module 66 may communicate with at least the battery assembly 24 and the charger module 62 to determine the real-time SOC of the battery assembly 24.

The control strategy 100 subsequently proceeds to block 108 if it is determined at the block 106 that the SOC of the battery assembly 24 is above the upper SOC threshold. At block 108, the thermal management system 64 is commanded to thermally condition the battery assembly 24 toward an ideal storage temperature for maximizing the useful life of the battery assembly 24. In one non-limiting embodiment, the battery assembly 24 is thermally conditioned to maintain a temperature between approximately 25° C. and 30° C. (77-86° F.). Power from the battery assembly 24 is used to power the thermal management system 64 during the block 108 in order to lower the SOC of the battery assembly 24 such that it is reduced to a level below the upper SOC threshold.

Once it is determined that the actual SOC of the battery assembly 24 does not exceed the upper SOC threshold at block 106, the control strategy 100 may proceed to block 110. The control strategy 100 determines whether the electrified vehicle 12 is On-Plug (i.e., connected to and/or receiving power from the external power source 68) at the block 110. If not On-Plug, the control strategy 100 ends at block 112. However, if the electrified vehicle 12 is On-Plug, the control strategy 100 proceeds to block 114 by determining whether the SOC of the battery assembly 24 is below a lower SOC threshold. The lower SOC threshold is a different value from the upper SOC threshold used during the block 106. In one non-limiting embodiment, the lower SOC threshold is set at 50% SOC. However, the lower SOC threshold is a customizable value that may be set at any desired percentage.

If the actual SOC is below the lower SOC threshold, the battery assembly 24 is charged to a desired SOC at block 116. This may include commanding the charger module 62 to produce a charging current for charging the battery assembly 24. However, if the SOC of the battery assembly 24 is not below the lower SOC threshold, then grid power from the external power source 68 is used to power the thermal management system 64 to maintain the battery assembly 24 at an ideal storage temperature for maximizing useful life at step 118.

If it is determined at the block 104 that Extended Life Mode 101 has not been selected, the control strategy 100 proceeds to block 120. At the block 120, the control strategy 100 determines whether the Normal Mode 103 has been selected. Normal Mode 103 may be selected by actuating the Normal Mode button 94 of the user interface 84, indicating that the passenger desires a balancing between vehicle range, useful life, etc.

If Normal Mode 103 has been selected at the block 120, the control strategy 100 determines whether the electrified vehicle 12 is On-Plug at block 122. If not, the control strategy 100 ends at block 112. However, if the electrified vehicle 12 is determined to be On-Plug, the control strategy 100 proceeds to block 124 by determining whether a temperature of the battery assembly 24 is within a predefined temperature range suitable for charging the battery assembly 24. Grid power is used to power the thermal management system 64 to thermally condition the battery assembly 24 at block 126 if the temperature is not within the predefined temperature range. Once the temperature of the battery assembly 24 is within the desired temperature range, the control strategy 100 proceeds to block 128 and charges the battery assembly 24 to a 100% SOC.

Next, as indicated by block 130, the battery assembly 24 is maintained at a 100% SOC. Finally, at block 132 of the normal mode 103, grid power may be used to selectively power the thermal management system 64 in order to thermally manage the battery assembly 24 and maintain ideal storage temperatures for maximum useful life.

The control strategy 100 may proceed to Energy Miser Mode 105 if Extended Life Mode 101 has not been selected at block 104 and Normal Mode 103 has not been selected at block 120. At block 134, the control strategy 100 may once again determine whether or not the electrified vehicle 12 is On-Plug. If not, the control strategy ends at block 112. However, if On-Plug, the control strategy 100 then determines whether the temperature of the battery assembly 24 is within a predefined temperature range for charging at block 136. Grid power is used to power the thermal management system 64 and thermally manage the battery assembly 24 if its temperature is not within the predefined temperature range at block 138. Once the temperature of the battery assembly 24 is found to be within an acceptable range, the battery assembly 24 is charged to 100% SOC at block 140. The control strategy 100 then ends at block 112. In Energy Miser Mode, the battery assembly 24 is only thermally managed to the extent necessary to facilitate fully charging, thereby emphasizing energy conservation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   conditioning a battery assembly of an electrified vehicle to a desired thermal level in a manner that extends useful life of the battery assembly, the conditioning step including heating or cooling the battery assembly with a thermal management system operable during both vehicle ON conditions and vehicle OFF conditions; and
   wherein the conditioning step includes powering the thermal management system using power from the battery assembly that is being conditioned if a state of charge (SOC) of the battery assembly exceeds an upper SOC threshold;
   wherein the conditioning step includes powering the thermal management system using grid power from an external power source if the SOC of the battery assembly is below the upper SOC threshold and the electrified vehicle is On-Plug.

2. The method as recited in claim 1, comprising determining if the electrified vehicle is On-Plug if the SOC of the battery assembly fails to exceed the upper SOC threshold.

3. The method as recited in claim 2, comprising determining whether the SOC of the battery assembly is below a lower SOC threshold if the electrified vehicle is On-Plug.

4. The method as recited in claim 3, comprising charging the battery assembly to a desired SOC level if the SOC of the battery assembly is below the lower SOC threshold.

5. The method as recited in claim 1, comprising controlling the battery assembly in an Extended Life Mode.

6. The method as recited in claim 5, comprising controlling the battery assembly in a Normal Mode if the Extended Life Mode has not been requested.

7. The method as recited in claim 6, comprising controlling the battery assembly in an Energy Miser Mode if neither the Extended Life Mode nor the Normal mode have been requested.

8. The method as recited in claim 1, wherein the conditioning step includes selectively heating and cooling the battery assembly to maintain the battery assembly within a desirable temperature range.

9. A method, comprising:
   thermally managing a battery assembly of an electrified vehicle with a thermal management system using power from the battery assembly being thermally managed if a state of charge (SOC) of the battery assembly exceeds an upper SOC threshold; and
   thermally managing the battery assembly using grid power from an external power source if the SOC of the battery assembly is below the upper SOC threshold and the electrified vehicle is On-Plug.

10. The method as recited in claim 9, comprising, prior to the thermally managing steps, determining whether an Extended Life Mode has been requested.

11. The method as recited in claim 9, comprising:
    determining if the electrified vehicle is On-Plug if the SOC of the battery assembly fails to exceed the upper SOC threshold; and
    if the electrified vehicle is On-Plug, then determining whether the SOC of the battery assembly is below a lower SOC threshold.

12. The method as recited in claim 11, comprising charging the battery assembly to a desired SOC level if the SOC of the battery assembly is below the lower SOC threshold.

13. The method as recited in claim 9, comprising:
    determining whether a Normal Mode for controlling the battery assembly has been requested;
    determining whether the electrified vehicle is On-Plug;
    determining whether a temperature of the battery assembly is within a predefined temperature range for charging; and
    thermally managing the battery assembly with the thermal management system using the grid power if the temperature of the battery assembly is outside of the predefined temperature range for charging.

14. The method as recited in claim 13, comprising charging the battery assembly to a 100% SOC after the temperature of the battery assembly is within the predefined temperature range for charging.

15. The method as recited in claim 14, comprising thermally managing the battery assembly with the thermal management system using the grid power to maintain the temperature of the battery assembly within the predefined temperature range for extending useful life of the battery assembly.

16. The method as recited in claim 9, comprising:
determining whether an Energy Miser Mode for controlling the battery assembly has been requested;
determining whether the electrified vehicle is On-Plug;
determining whether a temperature of the battery assembly is within a predefined temperature range for charging; and
thermally managing the battery assembly with the thermal management system using the grid power if the temperature of the battery assembly is outside of the predefined temperature range for charging.

17. The method as recited in claim 16, comprising charging the battery assembly to a 100% SOC after the temperature of the battery assembly is within the predefined temperature range for charging.

18. The method as recited in claim 9, wherein the thermally managing steps are performed in a manner that extends useful life of the battery assembly.

19. The method as recited in claim 9, wherein thermally managing the battery assembly includes selectively heating and cooling the battery assembly to maintain the battery assembly within a desirable temperature range.

20. A vehicle system, comprising:
a battery assembly;
a thermal management system configured to modify a temperature of the battery assembly;
a charger module configured to charge the battery assembly; and
a control module configured to command conditioning of the battery assembly using the thermal management system and configured to command charging of the battery assembly using the charger module in a manner that extends useful of the battery assembly, and configured to command powering of the thermal management system using power from the battery assembly that is being conditioned by the thermal management system if a state of charge (SOC) of the battery assembly exceeds an upper SOC threshold, and configured to command powering of the thermal management system using grid power from an external power source if the SOC of the battery assembly is below the upper SOC threshold and the vehicle system is On-Plug.

21. A method, comprising:
cooling a battery assembly of an electrified vehicle with a thermal management system during vehicle OFF conditions, wherein the thermal management system is powered using power from the same battery assembly that is being cooled by the thermal management system if a state of charge (SOC) of the battery assembly exceeds a predefined threshold.

* * * * *